United States Patent [19]
Mitchell et al.

[11] Patent Number: 6,081,091
[45] Date of Patent: Jun. 27, 2000

[54] MOTOR CONTROLLER, INTEGRATED CIRCUIT, AND METHOD OF CONTROLLING A MOTOR

[75] Inventors: Michael E. Mitchell; David A. Hayner, both of Austin, Tex.

[73] Assignee: Motorola, Inc., Schaumburg, Ill.

[21] Appl. No.: 09/263,561

[22] Filed: Mar. 8, 1999

[51] Int. Cl.[7] .................................................. G05B 19/40
[52] U.S. Cl. .......................... 318/685; 318/696; 318/254; 318/138; 318/439; 318/430; 318/431; 318/721; 318/722; 318/802
[58] Field of Search .................................. 318/254, 439, 318/138, 696, 685, 430, 431, 721, 802, 722

[56] References Cited

U.S. PATENT DOCUMENTS

| | | | |
|---|---|---|---|
| 4,162,435 | 7/1979 | Wright | 318/138 |
| 4,658,194 | 4/1987 | Richter et al. | 318/696 |
| 4,743,815 | 5/1988 | Gee et al. | 318/254 |
| 4,912,378 | 3/1990 | Vukosavic | 318/254 |
| 5,172,036 | 12/1992 | Cameron | 318/138 |
| 5,227,709 | 7/1993 | Gauthier et al. | 318/685 |
| 5,285,135 | 2/1994 | Carobolante et al. | 318/254 |
| 5,306,988 | 4/1994 | Carobolante et al. | 318/254 |
| 5,422,570 | 6/1995 | Moreira | 324/177 |
| 5,428,276 | 6/1995 | Carobolante et al. | 318/254 |
| 5,481,167 | 1/1996 | Rohrbaugh et al. | 318/254 |
| 5,512,805 | 4/1996 | Rohrbaugh et al. | 318/254 |
| 5,969,491 | 10/1999 | Viti et al. | 318/254 |

OTHER PUBLICATIONS

Howard F. Hendricks, "A Kinder, Gentler Controller Softens Torque Riple", Machine Design, pp. 83–86, Mar. 12, 1992.

Tomasek, et al., Motor–Amplifier Interface and Alignment in Sinewave–Controlled Brushless Servo Systems, MOTION, pp. 14 and pp. 16–20, Sep./Oct. 1987.

M. L. Patterson, "Analysis and Correction of Torque Harmonics in Permanent–Magnet Step Motors", pp. 25–37 (1979).

McInroy, et al. "Step Motor Supply: Minimizing Torque Ripple Induced by Digital Linearization", Control Eng. Practice, vol. 3, No. 9, pp. 1225–1235 (1995).

Yung, et al., "Analysis of Stepping Motor Torque Ripple Control for Precision Profiling", International Journal of Power and Energy Systems, vol. 17, No. 1 pp. 1–7 (1987).

SGS–Thomson Microelectronics, L6238, Sensorless Spindle Motor Controller, pp. 1/35–35/35 (1993).

B. C. Kuo, "Incremental Step Motion Control: Step Motros and Control Systems", pp. 412–436 (1974).

*Primary Examiner*—Karen Masih

[57] ABSTRACT

A motor controller includes an input terminal (22), a frequency selective network, a first controller, and a second controller. The input terminal is adapted to be coupled to a drive phase of a motor (16) for receiving a signal (24). The frequency selective network (18) has an input coupled to the input terminal (22) and an output for providing a first signal representative of the back EMF signal within a frequency range corresponding to a predetermined harmonic frequency above a primary frequency thereof. The first controller (20) has an input coupled to the output of the frequency selective network (18) and an output for providing a second signal representative of a position or a velocity of a rotor of the motor (16). The second controller (10) has an input coupled to the output of the first controller (20) and an output for providing a third signal. The third signal indicates how the motor (16) is to be driven.

20 Claims, 7 Drawing Sheets

MOTOR CONTROLLER, INTEGRATED CIRCUIT, AND METHOD OF CONTROLLING A MOTOR

FIELD OF THE INVENTION

The present invention relates generally to signal detection and control of motors.

BACKGROUND OF THE INVENTION

Many particular methods and systems for controlling motors of various types have been used commercially. Some methods for controlling a motor use an external sensor, such as an optical encoder or a Hall effect sensor to provide position information necessary to commutate or regulate the motor. However, in some applications, using an external sensor is undesirable due to the increased cost. An example in which an external sensor is undesirable includes a low cost printer or a hard disk drive using a step motor or a three phase brushless dc (BLDC) motor, respectively.

To address this external sensor cost concern, some step motors (U.S. Pat. No. 5,227,709) and BLDC motor (U.S. Pat. No. 4,162,435) systems avoid driving one of the motor phases and use an integrated voltage of the back electromotive force (BEMF) of the undriven motor phase to provide position information. For both motor types, such systems yield only a coarse estimate of position information to determine a next commutation point for the motor's stator. Using an undriven motor phase to provide position information leads to the motor having reduced maximum torque, increased torque ripple, and a lesser degree of velocity control, thereby reducing performance and effectively increasing cost to achieve the same torque requirements as compared to the same motor in which all motor phases are driven.

An alternate method to sensing the back EMF of a driven phase for a step motor is described in U.S. Pat. No. 4,658,194. This method takes an estimate of the back EMF by estimating the equation $Uemf = iR + L(di/dt) - U$. This method requires an estimate of the phase current through an external sense resistor which is not always desirable since power that could be delivered to the motor is now being dissipated in the external sense resistor. In addition, this method requires a considerable amount of circuitry to estimate the back EMF.

An improvement to U.S. Pat. No. 4,162,435 for BLDC motors is made in U.S. Pat. No. 4,743,815 and U.S. Pat. No. 5,422,570. In U.S. Pat. No. 4,743,815 a decode step is introduced which makes use of zero crossing information which is simpler than integrating the back EMF voltage. In U.S. Pat. No. 5,422,570 the third harmonic is extracted from a three phase, eye wound, trapezoidal back EMF motor by summing the terminal voltages. The zero crossing information is then used to control the motor. The methods described in these two patents have limitations requiring a BLDC motor:

U.S. Pat. Nos. 4,743,815 and 5,422,570 use a six state controller methodology in which one phase of the motor remains undriven and only provide 60 degrees of electrical resolution (position information), U.S. Pat. No. 4,743,815 requires a decode unit to determine zero crossings leading to increased circuitry and cost.

U.S. Pat. No. 5,422,570 requires a summation of the motor terminals to extract a third harmonic component and requires that the amplitude of the third harmonic component be larger than all harmonics except the primary. The method assumes a trapezoidal back EMF motor type (not sinusoidal which has better torque ripple characteristics) with a pole pitch other than ⅔ (a ⅔ pole pitch design does not have a significant 3rd harmonic). Due to the limitation and assumptions of a particular motor type, many motor applications, such as a printer carriage driven by a step motor, may not be addressed by using the teachings of U.S. Pat. No. 5,422,570.

U.S. Pat. No. 4,743,815 produces an output signal that contains spurious switching instants created by switching the motor drivers to the next commutation state. The switching instants are a problem for the controller at higher motor RPM's. U.S. Pat. No. 5,422,570 requires a high pass filter to remove the switching instants, all at further increased cost.

Accordingly, there is a need for an improved method and system of motor control that does not apply stringent conditions to the motor type. Ideally, this new method and system should operate without an undriven phase or external sensor and should increase the amount of position information available to the controller.

BRIEF DESCRIPTION OF THE DRAWINGS

While the invention is pointed out with particularity in the appended claims, other features of the invention are disclosed by the following detailed description taken in conjunction with the accompanying drawings, in which:

DETAILED DESCRIPTION OF THE PREFERRED EMBODIMENTS

Generally, the present invention relates to a motor controller, a method of controlling a motor, and an integrated circuit. The motor controller includes an input terminal adapted to be coupled to a stepper motor for receiving a signal from a single driven phase of the stepper motor. The motor controller includes a frequency selective network, a first controller, and a second controller. The frequency selective network has an input coupled to the input terminal and an output for providing a first signal representative of the back EMF signal within a frequency range corresponding to a predetermined harmonic frequency above a primary frequency thereof. The first controller has an input coupled to said output of said frequency selective network and an output for providing a second signal representative of a selected one of a position and a velocity of a rotor of said motor. The second controller has an input coupled to said output of the first controller and an output for providing a third signal. The third signal indicates how the motor is to be driven.

The method for controlling the motor includes the steps of receiving a signal from a driven phase of the motor, forming a first signal representative of said back EMF signal within a frequency range corresponding to a predetermined harmonic frequency above a primary frequency thereof, forming a second signal representative of a selected one of a position and a velocity of a rotor of said motor in response to said first signal, and forming a third signal which indicates how said motor is to be driven in response to said selected one of said position and said velocity of said rotor of said motor.

The integrated circuit includes an integrated circuit terminal adapted to receive an input signal from a driven phase of the motor. The frequency selective network has an input coupled to said integrated circuit terminal and an output for providing a first signal representative of said back EMF signal within a frequency range corresponding to a predetermined harmonic frequency above a primary frequency thereof.

It should be noted that the particular terms and expressions employed and the particular structural and operational details disclosed in the detailed description and accompanying drawings are for illustrative purposes only and are not intended to in any way limit the scope of the invention as described in the appended claims.

Figure 1:
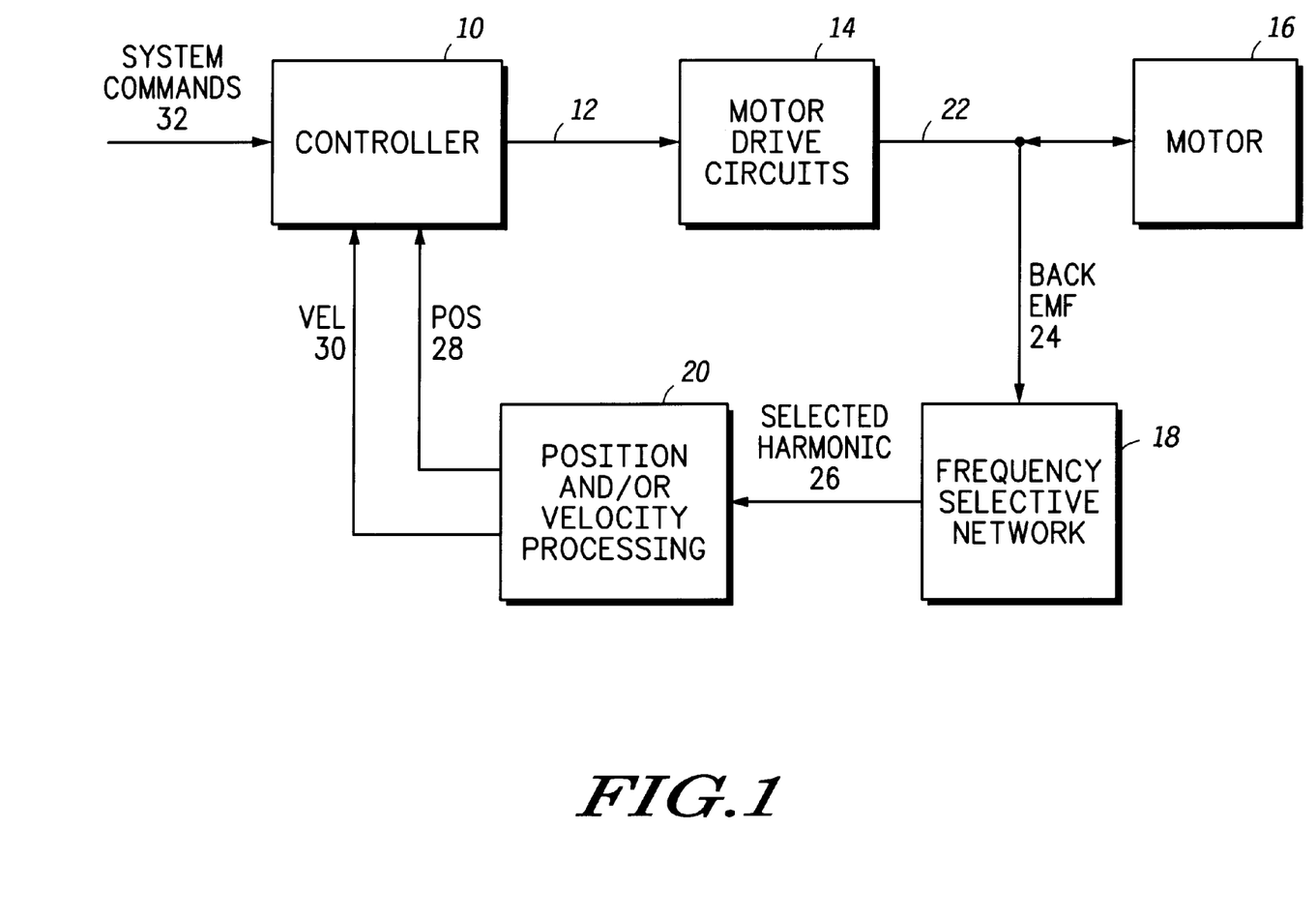
FIG. 1 is a block diagram of an embodiment of a motor control system.

Referring to FIG. 1, an embodiment of a motor control system is illustrated. The system includes a controller 10, a motor drive circuit 14, a motor 16, a frequency selective network 18, and a position and/or velocity processing module 20. The controller 10 receives system commands 32 and provides an output signal 12 that is typically a power drive circuit control signal. The motor drive circuit 14 receives the signal 12 and provides a motor drive signal 22 to drive motor 16 via an input terminal that is adapted to be coupled to the motor 16. The frequency selective network receives a back EMF signal 24 embedded within the drive signal 22 from a driven phase of the motor 16 and produces a harmonic of the back EMF signal 26. The harmonic signal 26 is any frequency harmonic other than the primary frequency of the drive signal 22. The position and/or velocity processing controller 20 receives the harmonic signal 26 and produces position signal 28 and/or velocity signal 30. The controller 10 receives the position signal 28 and/or the velocity signal 30 as a feedback signal and changes the output signal 12 based on these inputs. For example, controller 10 can use the position signal 28 to determine and generate a more accurate commutation signal as a part of output signal 12 to provide more accurate commutation information to the motor 16.

By using the detected position information within signal 28 that was derived from the back EMF signal 24, a more accurate timing signal from commutation the motor 16 can be produced. Depending on the type of motor 16, the position signal 28 may or may not necessarily be used. For example, with a brushless DC motor, the velocity signal 30 may be used to control the velocity drive signal 22 sent to the motor 16. In this case, the position signal 28 may not be needed by the controller 10.

The motor 16 may be any type of motor including a step motor, a brushless DC motor, a variable reluctance motor, and an AC induction motor.

Figure 2:
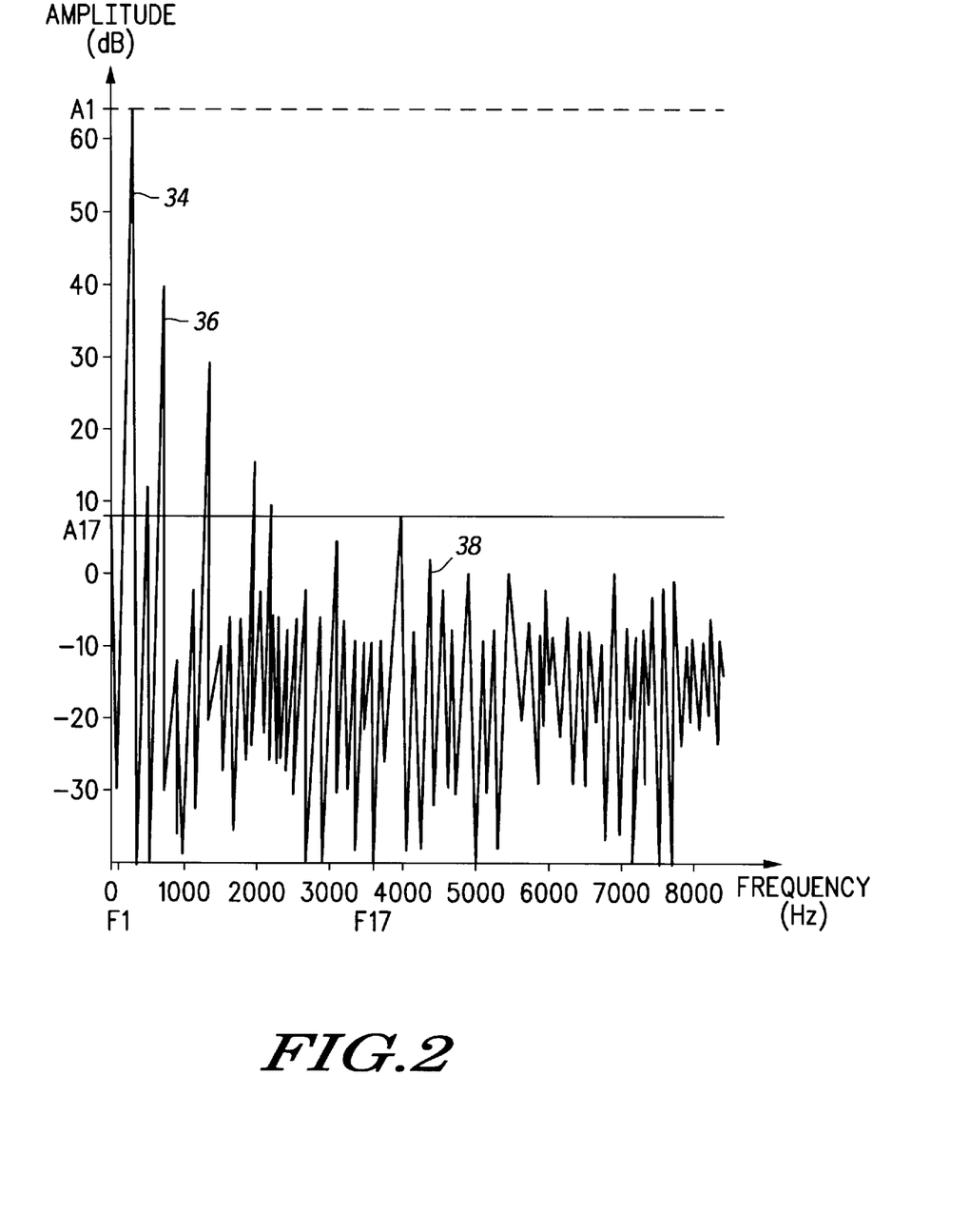
FIG. 2 is a general diagram that illustrates a back electro motive force (EMF) signal from a terminal of one phase of a multi-phase step motor.

Referring to FIG. 2, an amplitude versus frequency representation of the back EMF signal 24 without the overriding motor drive signal 22 component is shown for a Mitsumi M425P7 bipolar step motor. As illustrated, the EMF signal 24 has a plurality of different harmonic components. For example, the primary harmonic 34 is at about 250 Hz, the third harmonic 36 is at about 750 Hz, and the seventeenth harmonic 38 is at about 4250 Hz. For a selected harmonic, such as the third harmonic 34, the frequency amplitude of the selected harmonic is directly related to the mechanical velocity of the motor 16. Thus, if the EMF signal 24 is filtered to recover the selected harmonic, a mechanical velocity measurement may be directly derived from either the amplitude or frequency of the selected harmonic. Also, since the selected harmonic is in phase with the-primary harmonic, the selected harmonic can be used to determine the position of the BEMF of the motor 16. One method of determining position information is to count the number of zero crossings of the selected harmonic component in a certain time period. For example, for a step motor that has a seventeenth harmonic component having 50 electrical cycles/mechanical revolutions, and where the selected harmonic is the seventeenth harmonic, there are eight hundred fifty electrical cycles per mechanical revolution and seventeen hundred zero crossings of the selected harmonic for each complete mechanical rotor turn (i.e. 360 degrees) for each phase of the motor 16. Based on the above mapping information between electrical signal zero crossings and mechanical rotor turns, the zero crossing information from the selected harmonic can be directly translated into mechanical rotor position information for the motor 16.

Figure 3:
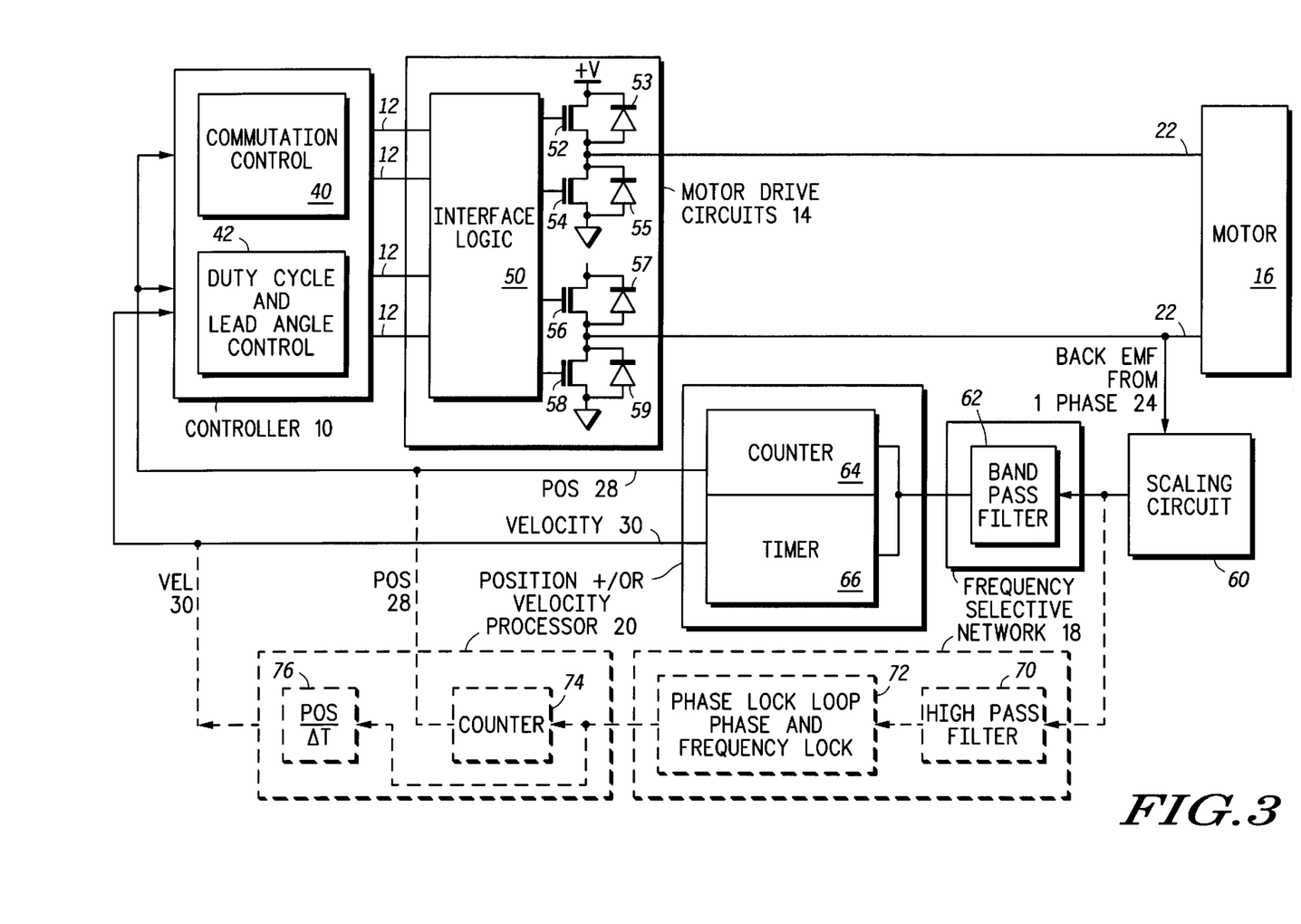
FIG. 3 is block diagram of a particular embodiment that more specifically illustrates the system of FIG. 1.

Referring to FIG. 3, a specific, more detailed example of the system of FIG. 1 is disclosed. The controller 10 includes a commutation control module 40 and a PWM duty cycle and lead angle control module 42. The motor drive circuits 14 include control logic 50 and various drive transistors 52–58. The drive transistors may be n-channel power type metal oxide semiconductor field effect (MOSFET) transistor or a vertical channel field effect transistor, such as a Motorola TMOS™ arranged in H-bridge configuration. The motor drive circuit 14 includes a plurality of drive stages with each stage coupled to a respective terminal of the motor 16. A drive stage may be formed from two series connected transistors, such as transistors 52 and 54. The frequency selective network 18 includes either a band pass filter 62 or a high pass filter 70 with phase lock loop 72. The system also includes a scaling circuit 60, such as a voltage divider resistive circuit. The position and/or velocity processing unit 20 includes a counter 64 and/or timer 66. In another alternative, the position and/or velocity processing unit 20 includes counter 74 and position to velocity converter 76.

During operation, a signal 22 including a motor drive component and a back EMF signal 24 is detected by the scaling circuit 60. In one embodiment, the signal 22 includes a plurality of drive signal that drive operation of the motor 16. The signal 22 is reduced in amplitude by the scaling circuit 60 and a reduced amplitude version is fed to the band pass filter 62. The signal fed to the scaling circuit 60 is received by measuring a voltage from at least one current driven phase of the motor 16. The motor phase producing the sensed signal is concurrently used to drive the motor. In this manner, extraction of the sense signal does not degrade normal motor operation.

The band pass filter 62 filters the received signal from the scaling circuit 60 and produces a selected harmonic of the back EMF signal 24. For example, the selected harmonic could be the seventeenth harmonic component 38 illustrated in FIG. 2. In this case, the band pass filter 62 would filter frequency components outside its pass frequency range. The pass frequency range would include the seventeenth harmonic so that the seventeenth harmonic component is the greatest component of the resulting filtered signal The selected harmonic is fed to the counter 64 to produce a motor rotor position signal 28 and is optionally fed to the timer 66 to measure a motor velocity signal 30. The resulting position signal 28 and velocity signal 30 are fed to the controller 10.

While one method of extracting a selected harmonic from the back EMF signal 24 is to use a band pass filter, many other techniques may be used. For example, another option is to use a high pass filter 70 with a phase lock loop having phase and frequency lock 72, as illustrated. In this case, the phase lock loop 72 is locked onto the frequency of the selected harmonic component of the back EMF signal 24. It is contemplated that many variations of the above harmonic extraction methods may be used. In this embodiment using the phase lock loop 72, the motor position sensor is a counter 74. To determine velocity of the motor 16, a time based derivative may be taken of the position signal 28 from the PLL 72 to thereby produce the velocity signal 30. The derivative may be taken by using an analog circuit, such as a derivative configured op amp, or by estimating a derivative digitally using a counter in hardware or software.

The controller 10 receives the position signal 28 and the velocity signal 30. A commutation controller 40 receives the position signal 28 and provides a commutation drive signal to a specific drive circuit based on the position signal 40. In this manner, using the high resolution feedback data from the position signal 28, the controller 10 more accurately provides a self-commutation closed loop motor control. In addition, due to lag in response time inherent within the motor 16, the position signal 28 may be used to provide a drive signal in advance. This method is referred to as lead angle control. In one embodiment, a lead angle control module 42 within the controller 10 receives the position signal 28 and provides lead angle adjust to the motor drive signals 22 that are applied to motor 16, which in one embodiment is a step motor. The result is a phase shifted voltage drive signal being applied to the motor 16 to make the phase of the drive current align with the back EMF.

One method of implementing the system is to use an integrated circuit, such as a microcontroller that includes a central processing unit, timers, program memory, pulse width modulators, and other peripheral circuits. The integrated circuit may be programmed with software routines to perform the functions of the position and/or velocity processor and the controller 10. An exemplary integrated circuit is the Motorola MCF 5204 microprocessor. In addition, the motor drive circuits 14 may also be included on the integrated circuit by using a semiconductor manufacturing process that allows fabrication of power transistors. Likewise, the frequency selective network may optionally be implemented on the same integrated circuit.

Figure 4:
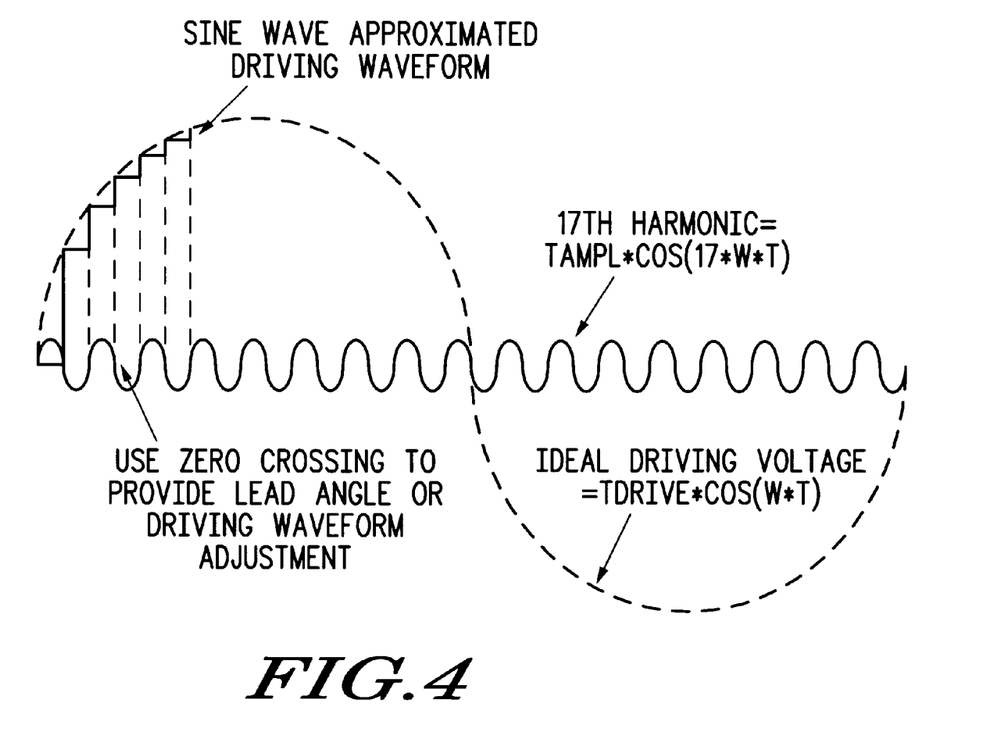
FIG. 4 is a general diagram that illustrates a motor driving waveform aligned with a seventeenth harmonic of a back EMF signal.

FIG. 4 illustrates how position information from a back EMF (BEMF) signal may be used to adjust a drive signal to a motor.

Since, stator windings within a motor have inductance, the driving current lags the driving voltage. In addition, the greater the mechanical velocity, the greater the BEMF since the amplitude of the BEMF is directly proportional to the motor speed. As the BEMF increases, the total voltage (supply voltage—BEMF voltage) available to drive the motor's current decreases. Compounding this problem is that the time available to reach the supply voltage decreases with increasing mechanical velocity and the stator's electrical time constant (L/R rise time) limits how fast this current can change. To address these problems, a current mode driver is typically used instead of a voltage mode driver. A current loop is more expensive but helps overcome the problem of increasing BEMF voltage amplitude by simplifying the overall control scheme. Other methods are typically used for a PWM based drive system.

For PWM based systems, the amplitude of the driving current does not remain constant because of the changing BEMF amplitude. In addition, the motor current lags the voltage since the motor windings have inductance. To overcome this, one of two methodologies could be implemented: 1) use the BEMF information from the motor to adjust the PWM duty cycle accordingly or 2) use the concept of a lead angle (Incremental Motion Control: Step Motors & Control Systems, Kuo, B. C., SRL Publishing Co., pp. 412–436, 1979). But using a lead angle to allow the motor voltage to build up earlier than normal requires position information. FIG. 4 illustrates using position information from the 17th harmonic of the motor to adjust the amplitude/PWM frequency of the driving waveform to overcome this BEMF problem. It should also be noted that the harmonic and the multiple of the harmonic start in phase for a given phase. This information may be used as a reference point in which to align the BEMF voltage and driving current. The BEMF amplitude may not be detectable at starting velocities (i.e., the system may require an open loop start followed by a closed loop lock).

Figure 5:
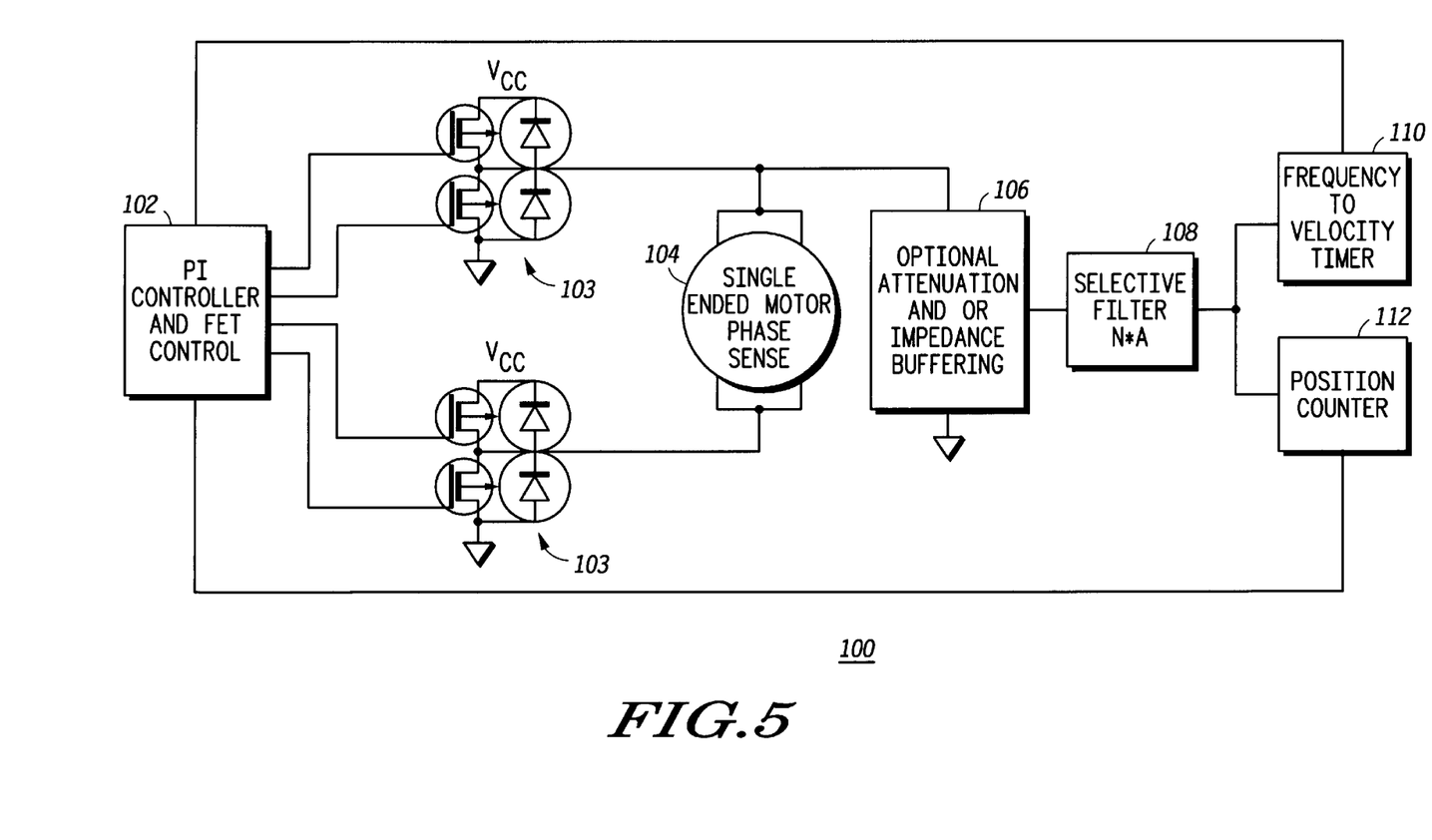
FIG. 5 is a block diagram that illustrates connection of a motor controller to a multiphase stepper motor.

FIG. 5 is the block diagram illustrating a system 100 in connection to one phase of a single or multi-phase step motor. The system 100 includes a controller 102, drive circuits 103, motor 104, attenuator 106, filter 108, velocity timer 110, and counter 112. The BEMF information is available for each motor winding (also referred to as phase). The technique may apply to multiple phases since the phases are offset by 360/N degrees electrically (where N is the number of motor phases) further increasing the resolution of the system. As a demonstration for a two phase bipolar step motor with 50 electrical cycles per revolution using the 17th harmonic:

17th harmonic=maximum of 34 zero crossings/Phase (see FIG. 4)

For a 50 electrical cycle/revolution motor:

Resolution=50*34=1700 zero crossings per revolution using one phase

Resolution=50*34*2=3400 zero crossings per revolution for two phases

The high resolution leads to a position information with improved accuracy, thereby leading to improved control of the motor.

Figure 6:
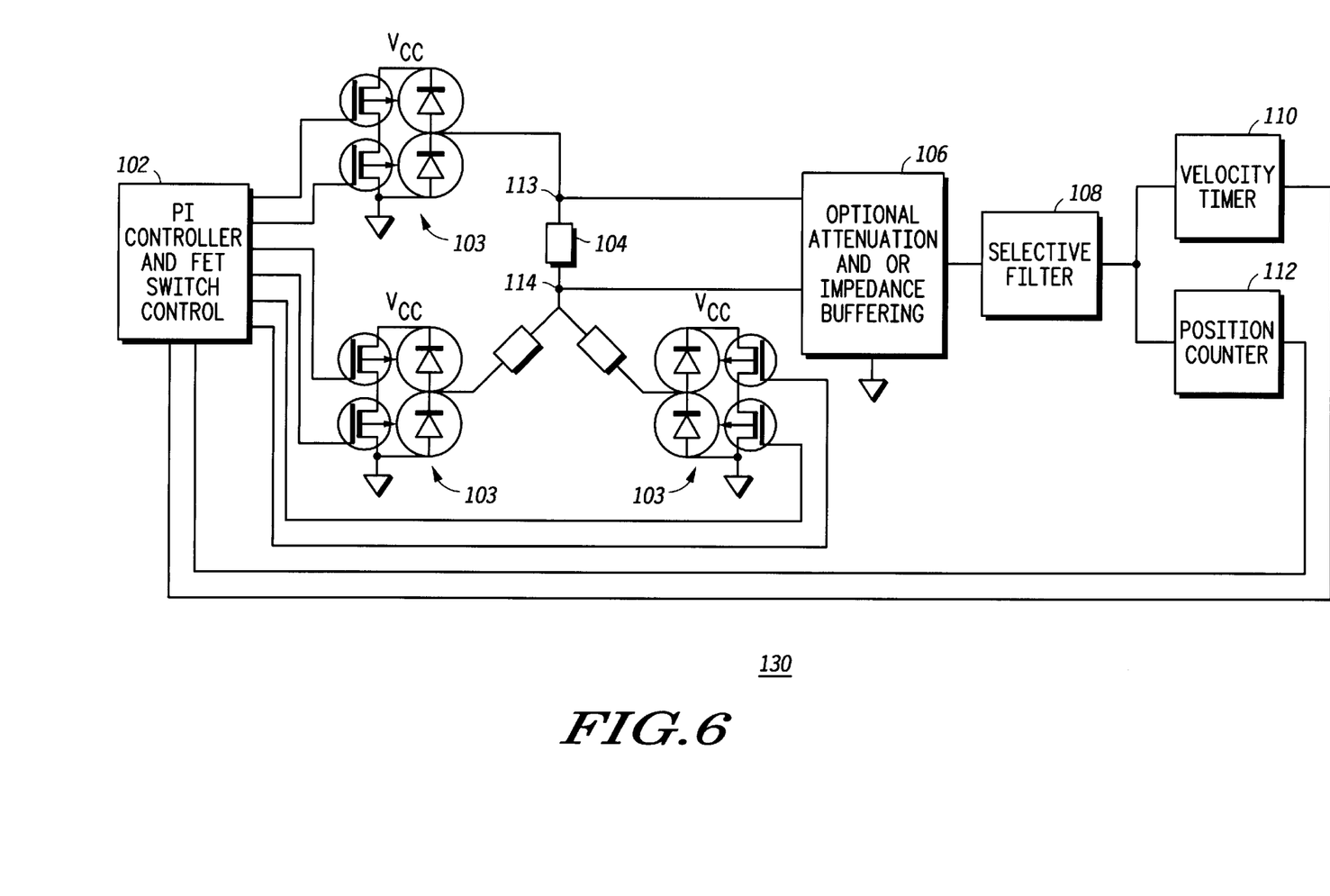
FIG. 6 is a block diagram that illustrates connection of a motor controller to a three phase brushless direct current motor.

FIG. 6 is a block diagram of an example of a system 130 in connection to a eye wound, 3 phase, BLDC motor. The system 130 is similar to system 100, except that system 130 includes a first terminal 113 and a second terminal 114 across one phase 104 of the motor. In addition, the motor of the system 130 has three drive circuits 103, each coupled to a different phase of the motor.

The selective filter can be either a bandpass filter or a phase lock loop PLL based on the motor and the system requirements. A PLL can be used to lock to a harmonic while the number of "visible" zero crossings could be radically increased using a high frequency voltage controlled oscillator VCO and a divider for the phase detector. Because of the PLL characteristics, the higher the harmonic the shorter the lock time. The type of detector for the PLL also has some significance. A Gilbert multiplier can be used to extract a buried signal with low amplitude. Using this type of mixer can reduce or eliminate the need for a pre-filter.

In contrast with the method described in U.S. Pat. Nos. 4,743,815 and 5,422,570, the above described technique is not limited to: a particular harmonic, summing of the motor terminals, a specific BEMF motor type or pole pitch, ideal motor characteristics, an undriven phase, or signal decoding. In contrast, this new method beneficially allows all phases of the motor to be driven, provides positioning and velocity information that does not contain spurious switching instants, and provides high resolution positioning information that is based on the motor's BEMF. The position information can be used to adjust the driving waveform and improve the motor's torque and velocity characteristics to a higher degree than is currently available in certain systems, without using an external sensor.

Figure 7:
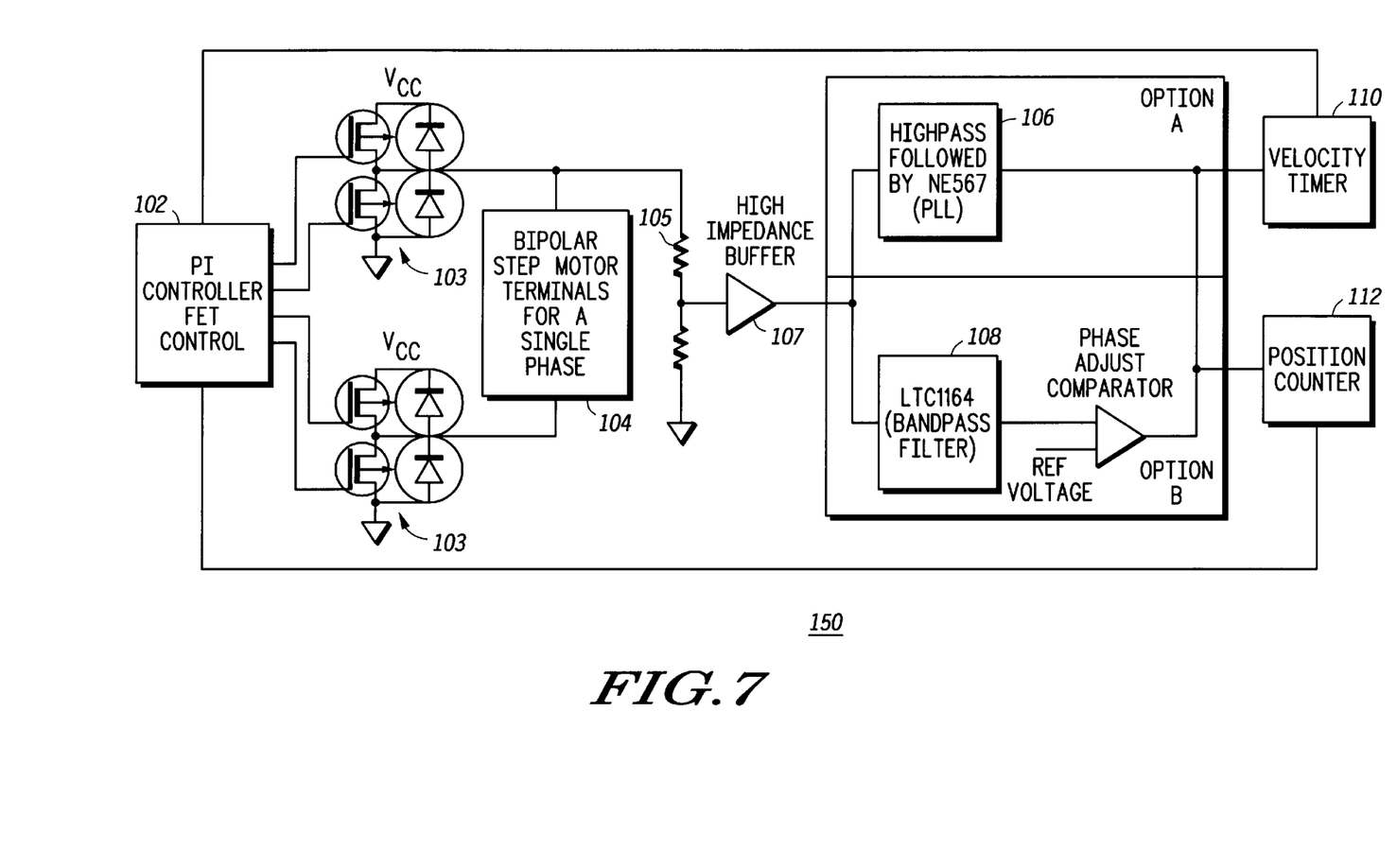
FIG. 7 is a block diagram that illustrates an embodiment of a motor controller and a bipolar step motor used to drive a printer carriage.

FIG. 7 is an embodiment of a low cost printer carriage controller system 150. The voltage divider is used to bring the motor driving voltage in range with the NE567 or LTC1164 voltage requirements (<5V). The proportional integral (PI) controller and the PWM based FET controller 102 can be implemented in hardware or a Microprocessor. A back EMF signal is received from a single driven phase of the bipolar motor 104.

There has been described herein an embodiment including at least one preferred embodiment of an improved motor controller and method of controlling a motor. It will be apparent to those skilled in the art that the disclosed subject matter may be modified in numerous ways and may assume many embodiments other than the preferred form specifically set out and described above. For example, the method and structure described with respect to FIG. 6 is also applicable for use with alternative motors, such as a delta wound motor. Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

What is claimed is:

1. A motor controller for use with a stepper motor, comprising:
    an input terminal adapted to be coupled to the stepper motor for receiving a signal from a driven phase of the stepper motor;
    a frequency selective network having an input coupled to said input terminal, and an output for providing a first signal representative of said signal within a frequency range corresponding to a predetermined harmonic frequency above a primary frequency thereof;
    a first controller having an input coupled to said output of said frequency selective network, and an output for providing a second signal representative of a selected one of a position and a velocity of a rotor of said stepper motor; and
    a second controller having an input responsive to said output of said first controller, and an output for providing a third signal, wherein said third signal is to control said motor.

2. The motor controller of claim 1 further comprising:
    at least one motor drive circuit having an input coupled to said output of said second controller for receiving said third signal, and an output for providing a plurality of drive signals to said motor.

3. The motor controller of claim 2 wherein said at least one motor drive circuit comprises:
    a plurality of drive stages, each coupled to a respective terminal of said motor, each drive stage comprising first and second series connected transistors,
    wherein said second controller provides said third signal to indicate which of said first and second series connected transistors are conductive.

4. The motor controller of claim 1 wherein said frequency selective network comprises a bandpass filter.

5. The motor controller of claim 1 wherein said frequency selective network comprises a phase locked loop.

6. The motor controller of claim 5 wherein said frequency selective network further comprises a highpass filter having an input coupled to said input terminal, and an output coupled to an input of said phase locked loop.

7. The motor controller of claim 1 further comprising a scaling and shifting circuit having an input coupled to said input terminal, and an output coupled to said input of said frequency selective network.

8. The motor controller of claim 1 wherein said first controller comprises:
    a counter having an input coupled to said output of said frequency selective network, and an output for providing said second signal to indicate said position of said rotor of said motor.

9. The motor controller of claim 8 wherein said first controller comprises:
    a differentiation circuit having an input coupled to said output of said frequency selective network, and an output for providing said second signal to indicate said velocity of said rotor of said motor in response to a change in said position over a predetermined time and wherein said stepper motor has multiple phases.

10. The motor controller of claim 1 wherein said first controller comprises:
    a timer having an input coupled to said output of said frequency selective network, and an output for providing said second signal to indicate said velocity of said rotor of said motor in response to an amplitude of said second signal.

11. The motor controller of claim 1 wherein said second controller comprises:
    a commutation control circuit having an input coupled to said output of said first controller for receiving said second signal indicating said position of said rotor of said motor, and an output for commutating said motor.

12. The motor controller of claim 1 wherein said second controller comprises:
    a lead angle control circuit having an input coupled to said output of said first controller for receiving said second signal indicating both said position and said velocity of said rotor of said motor, and an output for changing said third signal to control an amplitude of a drive signal of said motor.

13. A method for controlling a motor, comprising the steps of:
    receiving a signal from a terminal of a single driven phase of the motor;
    forming a first signal representative of said signal within a frequency range corresponding to a predetermined harmonic frequency above a primary frequency thereof;
    forming a second signal representative of a selected one of a position and a velocity of a rotor of said motor in response to said first signal; and
    forming a third signal which indicates how said motor is to be driven in response to said selected one of said position and said velocity of said rotor of said motor.

14. The method of claim 13 wherein said step of forming said first signal comprises the step of:
    bandpass filtering said signal around said predetermined harmonic frequency to provide said first signal, said predetermined harmonic frequency selected from a frequency greater than a third harmonic of the signal.

15. The method of claim 13 wherein said motor comprises a stepper motor that drives a printing carriage, and wherein said step of forming said first signal comprises the step of:

highpass filtering said signal to reject harmonics of said signal below said predetermined harmonic frequency of said signal to provide a filtered signal;

locking in phase and frequency to said predetermined harmonic frequency of said signal; and providing said second signal representative of a phase and frequency of said predetermined harmonic frequency of said signal.

16. An integrated circuit adapted to control a motor, comprising:

an integrated circuit terminal adapted to receive an input signal representative of a back electromotive force (EMF) signal from a current driven phase of the motor;

a frequency selective network having an input coupled to said integrated circuit terminal, and an output for providing a first signal representative of said signal within a frequency range corresponding to a predetermined harmonic frequency above a primary frequency thereof;

a first module for providing a second signal representative of a selected one of a position and a velocity of a rotor of said motor in response to said first signal; and a second module for providing a third signal in response to said selected one of said position and said velocity, wherein said third signal is indicative of how said motor is to be driven.

17. The integrated circuit of claim 16 further comprising a central processing unit and a memory coupled thereto, wherein said first module comprises said central processing unit executing a first plurality of instructions stored in said memory, and said second module comprises said central processing unit executing a second plurality of instructions stored in said memory.

18. The integrated circuit of claim 17 further comprising at least one motor drive circuit having an input coupled to said output of said second module for receiving said third signal, and an output for providing a plurality of drive signals to said motor.

19. The integrated circuit of claim 18 wherein said at least one motor drive circuit comprises:

a plurality of drive stages, each coupled to a respective terminal of said motor, each drive stage comprising first and second series connected power transistors, wherein said second module provides said third signal to indicate which of said first and second series connected transistors are conductive.

20. The integrated circuit of claim 19 wherein said first and second series connected transistors of said at least one motor drive circuit are metal-oxides emiconductor field effect transistors (MOSFETs) or vertical channel field effect transistors and wherein said motor is a bipolar stepper motor adapted to drive a printer carriage.

* * * * *

UNITED STATES PATENT AND TRADEMARK OFFICE
CERTIFICATE OF CORRECTION

PATENT NO. : 6,081,091
DATED : June 27, 2000
INVENTOR(S) : Michael E. Mitchell et al.

It is certified that an error appears in the above-identified patent and that said Letters Patent are hereby corrected as shown below:

Claim 20, column 10, line 25:
Reads "metal-oxides emiconductor" and should read -- metal-oxide-semiconductor --.

Signed and Sealed this

First Day of May, 2001

Attest:

NICHOLAS P. GODICI

*Attesting Officer*     *Acting Director of the United States Patent and Trademark Office*